(12) United States Patent
Zeng et al.

(10) Patent No.: US 7,190,827 B2
(45) Date of Patent: Mar. 13, 2007

(54) COLOR SPACE CONVERSION USING INTERPOLATION

(75) Inventors: Huanzhao Zeng, Vancouver, WA (US); Kevin R. Hudson, Camas, WA (US); Dongli Yang, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 10/349,880

(22) Filed: Jan. 22, 2003

(65) Prior Publication Data

US 2004/0141642 A1    Jul. 22, 2004

(51) Int. Cl.
- G06K 9/00    (2006.01)
- G06K 15/00    (2006.01)
- H04N 1/60    (2006.01)
- H04N 1/46    (2006.01)
- G03F 3/08    (2006.01)

(52) U.S. Cl. ........................ 382/162; 358/1.9; 358/2.1; 358/525; 358/518

(58) Field of Classification Search ................. 382/162
See application file for complete search history.

(56) References Cited

U.S. PATENT DOCUMENTS

| | | | |
|---|---|---|---|
| 4,985,759 A | | 1/1991 | Ito |
| 5,428,465 A | * | 6/1995 | Kanamori et al. .......... 358/518 |
| 5,850,471 A | * | 12/1998 | Brett ........................... 382/162 |
| 6,304,671 B1 | * | 10/2001 | Kakutani .................... 382/167 |
| 6,571,010 B1 | * | 5/2003 | Inoue ......................... 382/162 |
| 6,705,703 B2 | * | 3/2004 | Zeng et al. ..................... 347/43 |
| 7,009,734 B2 | * | 3/2006 | Suwa et al. ................... 358/1.9 |
| 7,016,530 B2 | * | 3/2006 | Saito et al. ................. 382/162 |
| 7,019,868 B2 | * | 3/2006 | Chang et al. ................ 358/2.1 |

FOREIGN PATENT DOCUMENTS

| | | |
|---|---|---|
| EP | 0820189 | 1/1998 |
| EP | 1173004 | 1/2002 |
| JP | 2002-033930 | 1/2002 |
| JP | 2002-064723 | 2/2002 |
| JP | 2002-077650 | 3/2002 |
| JP | 2002-335413 | 11/2002 |

OTHER PUBLICATIONS

Annex to EP search report dated Apr. 8, 2004.

* cited by examiner

*Primary Examiner*—Wenpeng Chen
*Assistant Examiner*—Yuzhen Ge

(57) ABSTRACT

A color space conversion technique uses a set of control lines in a first color space. Each control line includes several control points having predetermined values in a second color space. A planar region is identified among the set of control lines in the first color space. The planar region contains a number of target points that are to be interpolated from the first color space to the second color space. The planar region is partitioned into at least a first area and a quadrangular area. Target points in the quadrangular area correspond to a different set of colorants from the second color space than target points in the first area. A quadrangular interpolation is applied to the target points in the quadrangular area to determine corresponding values in the second color space based at least in part on the predetermined values of control points bounding the quadrangular area.

29 Claims, 10 Drawing Sheets

COLOR SPACE CONVERSION USING INTERPOLATION

BACKGROUND

"True" colors are defined by light wavelengths. A particular wavelength of light corresponds to one true color. Representing an image, however, as a collection of light wavelengths is often inconvenient for image processing. Therefore, a variety of systems have been developed to represent images in data formats that are more convenient for storing, displaying, and otherwise manipulating images. Each of these systems is referred to as a color space. Different devices often use different color spaces. Color space conversion is the process of converting an image from one color space to another. In many cases, the quality of a color conversion is the extent to which the true colors of an image in the first color space are maintained in the second color space.

Color spaces can be quite large. For example, display devices, such as computer monitors, televisions, and projectors, often use mixtures of red (R), green (G), and blue (B) color components, or "colorants." The color of each pixel displayed on a screen can be defined as some combination of these RGB colorants. If each colorant in an RGB color space is represented, for example, using 8-bits/channel, then each pixel in an image may comprise three bytes of color information. In which case, this 8-bit/channel RGB color space can theoretically display $2^{24}$, or about 16.77 million, different true colors.

Mapping over 16 million data points from one color space to another can be time consuming and resource intensive. Therefore, many color conversion techniques rely on interpolation. To interpolate data points, a certain number of data points are first mapped from one color space to another using any of a number of mathematical or experimental approaches. These data points comprise a set of "control points," having predetermined values in both color spaces. Then, when a data point is encountered that has not already been mapped, a value for the data point in the second color space is estimated based on the position of the data point relative to the control points in the first color space.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the embodiments of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the embodiments of the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Various embodiments of the present invention provide an improved technique for color space conversion and interpolation. After control points have been mapped between a first color space and a second color space, embodiments of the present invention apply various interpolation techniques to target points in different regions of the first color space to determine values of the target points in the second color space while limiting certain colorants to certain regions in the second color space. Numerous embodiments of the present invention are discussed below to provide examples of how the present invention can be implemented and used.

Figure 1:
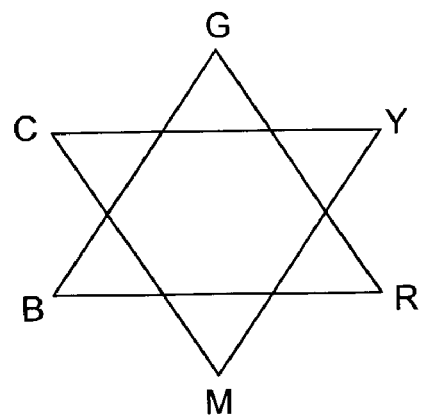
FIG. 1 illustrates one embodiment of color correspondences.

FIG. 1 illustrates one embodiment of color correspondences between a red, green, and blue (RGB) color space and a cyan, magenta, and yellow (CMY) color space. Although embodiments of the present invention are described below primarily with respect to color conversions between RGB and various forms of CMY color spaces, the present invention is not limited to the illustrated color conversions and can be used for color conversions between any of a variety of color spaces.

Computer monitors, televisions, and projectors usually generate red, green, and blue photons, so these display devices often use RGB color spaces. Imaging devices, such as color printers, do not usually generate photons, but instead print reflective pigments, such as cyan, magenta, and yellow, so these display devices often use CMY color spaces. An RGB to CMY color conversion is likely to occur each time a color document is printed from a computer. CMY color spaces can be defined much like the RGB color space described above in the background, with each pixel of an image comprising as a mixture of CMY colorant intensities.

As shown in FIG. 1, a combination of M and Y, with no C, produces R. Similarly, a combination of Y and C, with no M, produces G. And, a combination of C and M, with no Y, produces B. Using this type of color correspondence, a color space can be created to map RGB to CMY.

Figure 2:
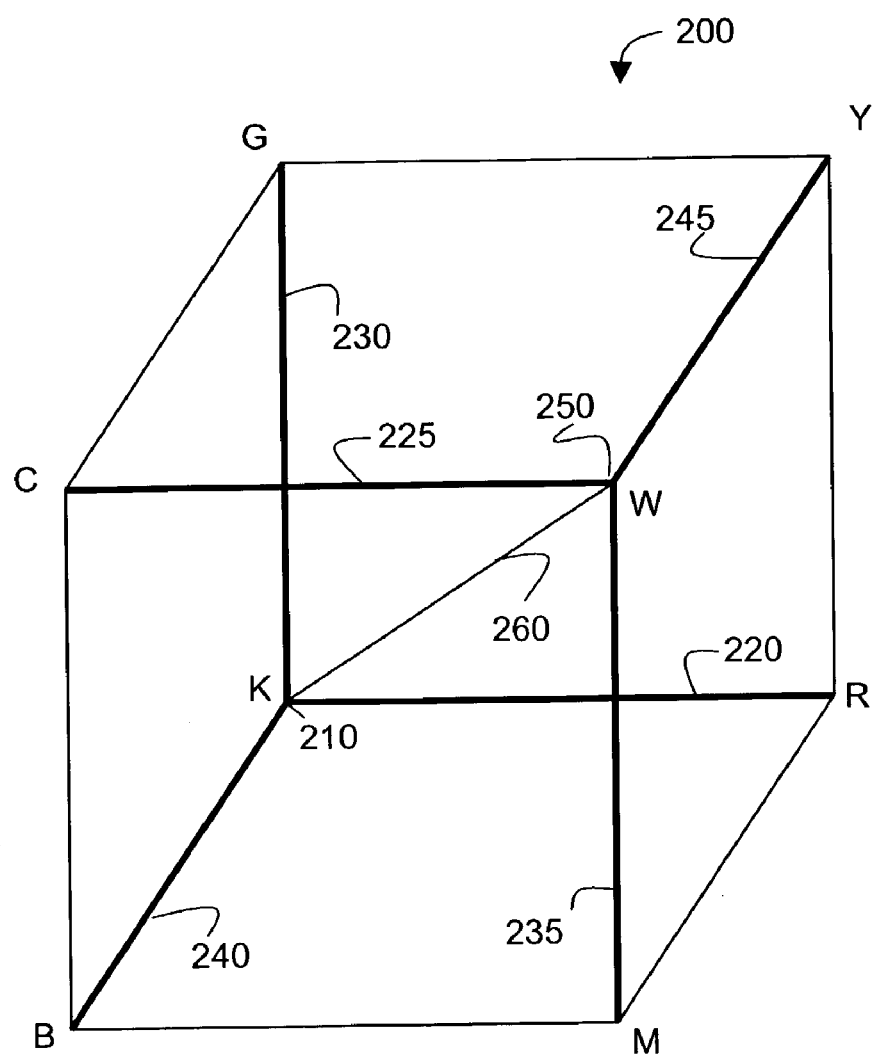
FIG. 2 illustrates one embodiment of an RGB color space.

FIG. 2 illustrates one embodiment of a color space cube 200 for mapping RGB and CMY colors. Cube 200 has an origin 210, and three primary axes 220, 230, and 240, one for each of the RGB colors. Axis 220 corresponds to R intensity, ranging from zero at the origin 210 up to a maximum. Axis 230 similarly corresponds to G intensity, and axis 240 similarly corresponds to B intensity. The origin 210 is black (K), where RGB are all zero. Where RGB are all maximum, the color is white (W) at point 250.

Cube 200 similarly includes a coordinate system for the CMY colors inverted over the RGB coordinate system. That is, the W point 250 is the origin for the CMY colors where CMY are all zero, and the K point 210 is where CMY are all maximum. The CMY colors have three primary axes, 225, 235, and 245. Axis 225 corresponds to C intensity, ranging from a minimum at point 250 up to a maximum. C intensity is inversely related to R intensity on axis 220. Similarly, axis 235 corresponds to M intensity, and is inversely related to G intensity on axis 230. And, axis 245 corresponds to Y intensity, and is inversely related to B intensity on axis 240.

In the ideal situation, there would be a one-to-one, linear correspondence between the two coordinate systems, and converting RGB to CMY would simply be a matter converting a point in the RGB coordinate system to the same point in the CMY coordinate system. In reality, however, converting between RGB and CMY color spaces can be much more complicated due to various factors, making a one-to-one, linear correspondence between the two coordinate systems very unlikely.

The colorants, the print mechanism, and the print medium are all examples of factors that can complicate how a CMY color space maps to an RGB color space. For example, toners, inks, and waxes are often used as colorants in CMY color spaces. Each colorant is usually comprised entirely of one particular color intensity, or shade of color. For the case in which the colorant is a liquid colorant, to change the appearance of intensity for a color in an image, the density of tiny droplets of the colorant can be changed. Each droplet of a colorant may be the same intensity, but depending on how many droplets are deposited in a given area, the colorant appears more or less intense. The high end of the intensity range for a given colorant is often where the print medium becomes saturated with the colorant and the intensity cannot be increased. The low end of the intensity range for a given colorant is often where the droplets are scattered so sparsely so as to be individually distinguishable by the naked eye, at which point the intensity cannot decrease further without making the image look grainy. The intensity ranges of CMY colorants are often inadequate to fully represent the intensity ranges of RGB colorants.

One way to increase the intensity ranges is to use additional colorants. Additional colorants are another factor that can complicate color conversion. For instance, a CMYK color space adds a black (K) colorant. In a CMYK color space, K can be mixed in to represent the darker true colors, potentially increasing the intensity range. A CMYKlclm color space adds two more colorants, low-dye cyan (lc) and low-dye magenta (lm). lc and lm can be mixed in to smooth out the lighter true colors, also potentially increasing the intensity range.

When additional colorants are used, certain colorants are often limited to particular regions of a color space. Limiting colorants in this way is referred to as color separation, and color separation also complicates color conversion. For instance, in the color cube of FIG. 2, a K colorant may be primarily used in a region of darker true colors near the origin 210 to substantially reduce sparsely scattered K colorant in regions of lighter true colors where K may make the image appear grainy. Similarly, C or M colorants may be primarily used in regions near the ends of the C axis 225 or the M axis 235, respectively, to substantially reduce sparsely scattered C or M colorants in regions of lighter true colors where C or M may also make the image appear grainy.

A data point can be converted from one color space to another color space using any of a number of mathematical or experimental approaches. But, with all of the potential complicating factors, such as those described above, color conversion calculations can be excessively time consuming, especially for a large volume of data points. For this reason, a look-up table (LUT) is often used to store color conversions so that conversions can simply be looked-up when they are needed. In most circumstances, using a LUT is much faster than performing calculations.

A LUT for an entire color space, however, could be quite large. For example, an 8-bit per-channel RGB color space using three bytes for each data point, comprises $2^{24}$ data points. When mapping to an 8-bit/channel CMYK color space using four bytes for each data point, $2^{24}$ times four bytes, or about 70 megabytes, of memory would be needed to store a conversion table for the entire color space. For an 8-bit/channel CMYKlclm color space, $2^{24}$ times six bytes, or about 100 mega bytes, of memory would be needed to store a conversion table for the entire color space. In either case, the amount of memory is likely to be impractical, especially in competitive consumer electronics markets.

Rather than storing conversions for every data point, a subset of the conversions could be stored in the LUT, and then an interpolation approach could be used to dynamically estimate color conversions on the fly for data points between those in the table. Of course, the more data points included in the LUT, the more accurate the dynamic interpolations are likely to be. But, the larger the LUT, the more memory needed and the longer it takes to populate with conversions.

The time it takes to populate a LUT can be very important because any time one of the factors affecting color conversions changes, a new LUT is likely to be needed. This could mean repopulating the LUT every time the print medium is changed, every time an ink cartridge is replaced, every time a print job is received from a different computer having a different RGB color space, etc.

Often times, a LUT includes one data point for every X data points in a color space. For the 8-bit RGB, having $2^{24}$ data points in the color space, the LUT often includes every $16^{th}$ or ever $32^{nd}$ data point, although the LUT may include more or less. The number of data points is often selected so as to evenly divide the total number of data points in the color space. For 8-bit bytes, with values ranging from 0 to 255, every $16^{th}$ data point means a total of 17 values are used for each colorant. Since there are three colorants in the RGB space, the LUT would hold $17^3$, or 4913, data points. In an 8-bit/channel CMYK conversion, the LUT would need 4913 times four bytes, or about 20 Kbytes, of memory. In an 8-bit/channel CMYKlclm, the LUT would need about 30 Kbytes of memory.

Although using a subset of conversions in a LUT can greatly reduce memory requirements, the time needed to populate the LUT may still be prohibitive. In the example above, 4913 conversions are needed. If each conversion has to be fully calculated, populating the LUT could take several seconds or longer. In order to reduce the time, conversions can be calculated for a subset of the LUT entries. Then, embodiments of the present invention can apply an interpolation technique to populate the rest of the LUT entries.

In one embodiment, conversions are calculated for a set of control points. Control points are often selected along 13 lines in a color space. The color space in FIG. 2 shows one of the control lines, control line 260. Control line 260 extends between the K point 210 and the W point 250. Control line 260 is referred to as the neutral control line because it passes through the middle of the color space.

Figure 3:
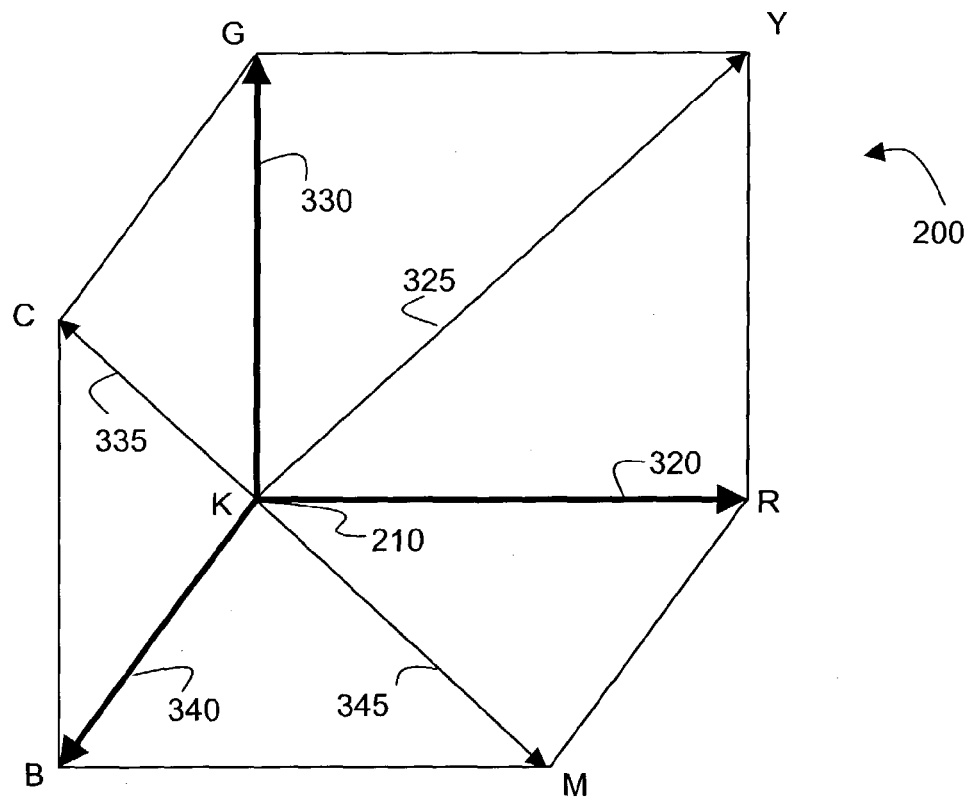
FIG. 3 illustrates one embodiment of a partial set of control lines.
Figure 4:
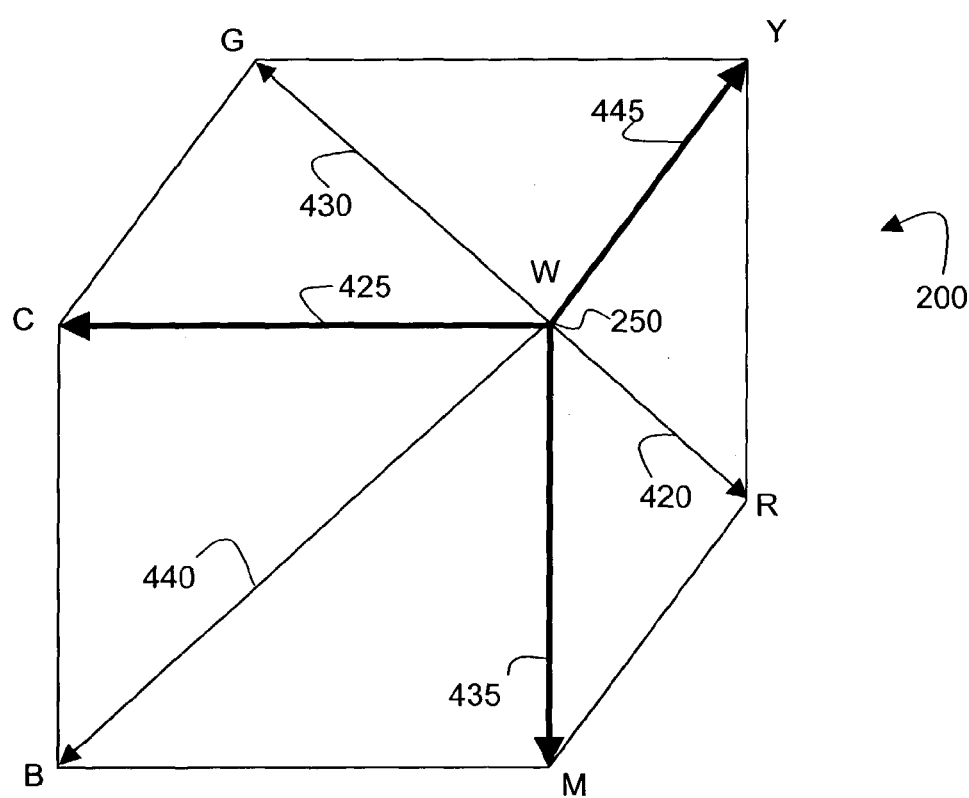
FIG. 4 illustrates one embodiment of another partial set of control lines.

The other 12 control lines are illustrated in FIGS. 3 and 4. In FIG. 3, six control lines, 320, 330, 340, 335, 345, and 325, extend from the K point 210 to each of the six primary colorants RGB and CMY, respectively. In FIG. 4, six control lines, 420, 430, 440, 425, 435, and 445, similarly extend from the W point 250 to each of the six primary colorants RGB and CMY, respectively.

Figure 5:
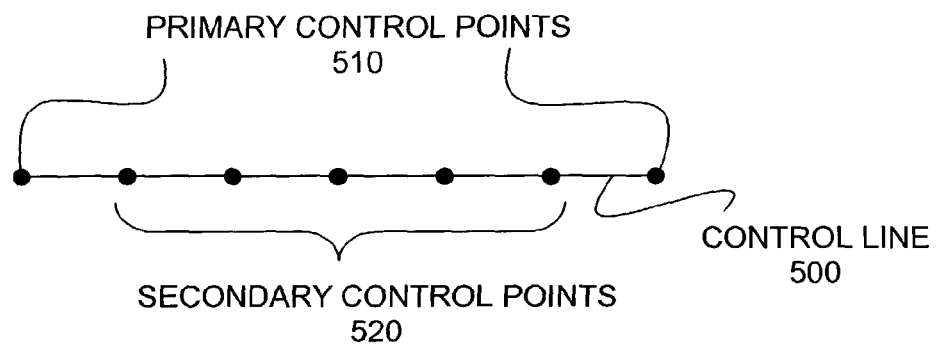
FIG. 5 illustrates one embodiment of control points along a control line.

FIG. 5 illustrates one embodiment of control points on a control line 500. Control line 500 has primary control points 510 at either end and secondary control points 520 at intervals over the length of the control line. The primary control points 510 correspond to the corners of the color cube 200. In other words, the primary control points 510 comprise points in the color space where one of the primary colorants, R, G, B, C, M, or Y, is a maximum, or where the color space is W or K. The total number of control points on a control line depends on the number of data points included in the LUT. For instance, LUT that includes every $16^{th}$ or $32^{nd}$ data point will usually have 17 or 9 control points, respectively, per control line.

Table 1 below illustrates a LUT for an 8-bit/channel RGB to an 8-bit/channel CMYK color conversion using only 5 control points per control line for ease of illustration. Even with just 5 control points per control line, Table 1 includes 125 data points. Table 1 includes the values for both the RGB and the CMYK data points for purposes of explanation. In practice however, a LUT is unlikely to include the RGB values. Rather, the LUT will usually rely on an index, or simply a position in memory, to indicate the RGB values.

TABLE 1

| Index | R | G | B | C | M | Y | K |
|---|---|---|---|---|---|---|---|
| *0 | 0 | 0 | 0 | 255 | 255 | 255 | 255 |
| *1 | 0 | 0 | 63 | 255 | 255 | 191 | 127 |
| *2 | 0 | 0 | 127 | 255 | 255 | 127 | 0 |
| *3 | 0 | 0 | 191 | 255 | 255 | 63 | 0 |
| *4 | 0 | 0 | 255 | 255 | 255 | 0 | 0 |
| *5 | 0 | 63 | 0 | 255 | 191 | 255 | 63 |
| *6 | 0 | 63 | 63 | 255 | 191 | 191 | 127 |
| 7 | 0 | 63 | 127 | | | | |
| 8 | 0 | 63 | 191 | | | | |
| 9 | 0 | 63 | 255 | | | | |
| *10 | 0 | 127 | 0 | 255 | 127 | 255 | 0 |
| 11 | 0 | 127 | 63 | | | | |
| *12 | 0 | 127 | 127 | 255 | 127 | 127 | 0 |
| 13 | 0 | 127 | 191 | | | | |
| 14 | 0 | 127 | 255 | | | | |
| *15 | 0 | 191 | 0 | 255 | 63 | 255 | 0 |
| 16 | 0 | 191 | 63 | | | | |

TABLE 1-continued

| Index | R | G | B | C | M | Y | K |
|---|---|---|---|---|---|---|---|
| 17 | 0 | 191 | 127 | | | | |
| *18 | 0 | 191 | 191 | 255 | 63 | 63 | 0 |
| 19 | 0 | 191 | 255 | | | | |
| *20 | 0 | 255 | 0 | 255 | 0 | 255 | 0 |
| 21 | 0 | 255 | 63 | | | | |
| 22 | 0 | 255 | 127 | | | | |
| 23 | 0 | 255 | 191 | | | | |
| *24 | 0 | 255 | 255 | 255 | 0 | 0 | 0 |
| *25 | 63 | 0 | 0 | 191 | 255 | 255 | 63 |
| *26 | 63 | 0 | 63 | 191 | 255 | 191 | 127 |
| 27 | 63 | 0 | 127 | | | | |
| 28 | 63 | 0 | 191 | | | | |
| 29 | 63 | 0 | 255 | | | | |
| *30 | 63 | 63 | 0 | 191 | 191 | 255 | 63 |
| *31 | 63 | 63 | 63 | 191 | 191 | 191 | 127 |
| 32 | 63 | 63 | 127 | | | | |
| 33 | 63 | 63 | 191 | | | | |
| *34 | 63 | 63 | 255 | 191 | 191 | 0 | 0 |
| 35 | 63 | 127 | 0 | | | | |
| 36 | 63 | 127 | 63 | | | | |
| 37 | 63 | 127 | 127 | | | | |
| 38 | 63 | 127 | 191 | | | | |
| 39 | 63 | 127 | 255 | | | | |
| 40 | 63 | 191 | 0 | | | | |
| 41 | 63 | 191 | 63 | | | | |
| 42 | 63 | 191 | 127 | | | | |
| 43 | 63 | 191 | 191 | | | | |
| 44 | 63 | 191 | 255 | | | | |
| 45 | 63 | 255 | 0 | | | | |
| *46 | 63 | 255 | 63 | 191 | 0 | 191 | 0 |
| 47 | 63 | 255 | 127 | | | | |
| 48 | 63 | 255 | 191 | | | | |
| *49 | 63 | 255 | 255 | 191 | 0 | 0 | 0 |
| *50 | 127 | 0 | 0 | 127 | 255 | 255 | 0 |
| 51 | 127 | 0 | 63 | | | | |
| *52 | 127 | 0 | 127 | 127 | 255 | 127 | 0 |
| 53 | 127 | 0 | 191 | | | | |
| 54 | 127 | 0 | 255 | | | | |
| 55 | 127 | 63 | 0 | | | | |
| 56 | 127 | 63 | 63 | | | | |
| 57 | 127 | 63 | 127 | | | | |
| 58 | 127 | 63 | 191 | | | | |
| 59 | 127 | 63 | 255 | | | | |
| *60 | 127 | 127 | 0 | 127 | 127 | 255 | 0 |
| 61 | 127 | 127 | 63 | | | | |
| *62 | 127 | 127 | 127 | 127 | 127 | 127 | 0 |
| 63 | 127 | 127 | 191 | | | | |
| *64 | 127 | 127 | 255 | 127 | 127 | 0 | 0 |
| 65 | 127 | 191 | 0 | | | | |
| 66 | 127 | 191 | 63 | | | | |
| 67 | 127 | 191 | 127 | | | | |
| 68 | 127 | 191 | 191 | | | | |
| 69 | 127 | 191 | 255 | | | | |
| 70 | 127 | 255 | 0 | | | | |
| 71 | 127 | 255 | 63 | | | | |
| *72 | 127 | 255 | 127 | 127 | 0 | 127 | 0 |
| 73 | 127 | 255 | 191 | | | | |
| *74 | 127 | 255 | 255 | 127 | 0 | 0 | 0 |
| *75 | 191 | 0 | 0 | 63 | 255 | 255 | 0 |
| 76 | 191 | 0 | 63 | | | | |
| 77 | 191 | 0 | 127 | | | | |
| *78 | 191 | 0 | 191 | 63 | 255 | 63 | 0 |
| 79 | 191 | 0 | 255 | | | | |
| 80 | 191 | 63 | 0 | | | | |
| 81 | 191 | 63 | 63 | | | | |
| 82 | 191 | 63 | 127 | | | | |
| 83 | 191 | 63 | 191 | | | | |
| 84 | 191 | 63 | 255 | | | | |
| 85 | 191 | 127 | 0 | | | | |
| 86 | 191 | 127 | 63 | | | | |
| 87 | 191 | 127 | 127 | | | | |
| 88 | 191 | 127 | 191 | | | | |
| 89 | 191 | 127 | 255 | | | | |
| *90 | 191 | 191 | 0 | 63 | 63 | 255 | 0 |
| 91 | 191 | 191 | 63 | | | | |
| 92 | 191 | 191 | 127 | | | | |
| *93 | 191 | 191 | 191 | 63 | 63 | 63 | 0 |

TABLE 1-continued

| Index | R | G | B | C | M | Y | K |
|---|---|---|---|---|---|---|---|
| *94 | 191 | 191 | 255 | 63 | 63 | 0 | 0 |
| 95 | 191 | 255 | 0 | | | | |
| 96 | 191 | 255 | 63 | | | | |
| 97 | 191 | 255 | 127 | | | | |
| *98 | 191 | 255 | 191 | 63 | 0 | 63 | 0 |
| *99 | 191 | 255 | 255 | 63 | 0 | 0 | 0 |
| *100 | 255 | 0 | 0 | 0 | 255 | 255 | 0 |
| 101 | 255 | 0 | 63 | | | | |
| 102 | 255 | 0 | 127 | | | | |
| 103 | 255 | 0 | 191 | | | | |
| *104 | 255 | 0 | 255 | 0 | 255 | 0 | 0 |
| 105 | 255 | 63 | 0 | | | | |
| *106 | 255 | 63 | 63 | 0 | 191 | 191 | 0 |
| 107 | 255 | 63 | 127 | | | | |
| 108 | 255 | 63 | 191 | | | | |
| *109 | 255 | 63 | 255 | 0 | 191 | 0 | 0 |
| 110 | 255 | 127 | 0 | | | | |
| 111 | 255 | 127 | 63 | | | | |
| *112 | 255 | 127 | 127 | 0 | 127 | 127 | 0 |
| 113 | 255 | 127 | 191 | | | | |
| *114 | 255 | 127 | 255 | 0 | 127 | 0 | 0 |
| 115 | 255 | 191 | 0 | | | | |
| 116 | 255 | 191 | 63 | | | | |
| 117 | 255 | 191 | 127 | | | | |
| *118 | 255 | 191 | 191 | 0 | 63 | 63 | 0 |
| *119 | 255 | 191 | 255 | 0 | 63 | 0 | 0 |
| *120 | 255 | 255 | 0 | 0 | 0 | 255 | 0 |
| *121 | 255 | 255 | 63 | 0 | 0 | 191 | 0 |
| *122 | 255 | 255 | 127 | 0 | 0 | 127 | 0 |
| *123 | 255 | 255 | 191 | 0 | 0 | 63 | 0 |
| *124 | 255 | 255 | 255 | 0 | 0 | 0 | 0 |

In Table 1, each control point has an * next to its index number. The 13 control lines, with five control points per line, include a total of 47 unique control points. The six control lines for K to the six primary colorants (RGBCYM) include the following control points:

KR=(0,0,0), (63,0,0), (127,0,0), (191,0,0), (255,0,0)
KG=(0,0,0), (0,63,0), (0,127,0), (0,191,0), (0,255,0)
KB=(0,0,0), (0,0,63), (0,0,127), (0,0,191), (0,0,255)
KC=(0,0,0), (0,63,63), (0,127, 127), (0,191,191), (0,255,255)
KM=(0,0,0), (63,0,63), (127,0,127), (191,0,191), (255,0,255)
KY=(0,0,0), (63,63,0), (127,127,0), (191,191,0), (255,255,0).

These six control lines define a total of 25 unique control points. The six control lines from W to the six primary colorants (RGBCYM) include the following control points:

WR=(255,255,255), (255,191,191), (255,127,127), (255,63,63), (255,0,0)
WG=(255,255,255), (191,255,191), (127,255,127), (63,255,63), (0,255,0)
WB=(255,255,255), (191,191,255), (127,127,255), (63,63,255), (0,0,255)
WC=(255,255,255), (191,255,255), (127,255,255), (63,255,255), (0,255,255)
WM=(255,255,255), (255,191,255), (255,127,255), (255,63,255), (255,0,255)
WY=(255,255,255), (255,255,191), (255,255,127), (255,255,63), (255,255,0).

These six control lines define an additional 19 unique control points. The last control line from K to W includes the following control points:

KW=(0,0,0), (63,63,63), (127,127,127), (191,191,191), (255,255,255).

This control line defines an additional 3 unique control points for the total 47 control points.

Once the control points have all been mapped, embodiments of the present invention can be used to interpolate the remaining data points in the LUT. Since the LUT in Table 1 includes a total of 125 data points, and there are 47 unique control points, 78 target data points remain to be interpolated.

Figure 6:
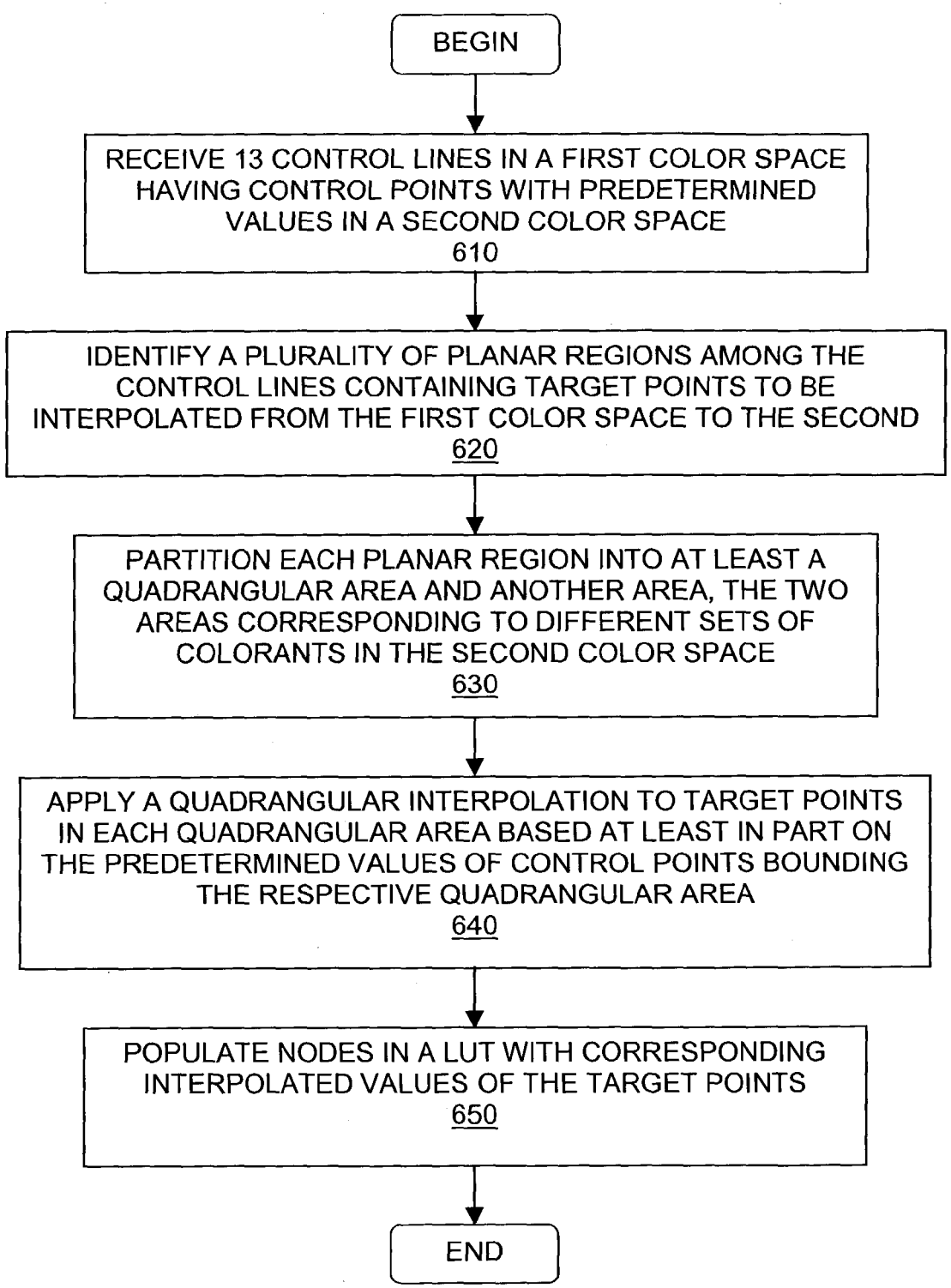
FIG. 6 illustrates one embodiment of the present invention at a high level.

FIG. 6 illustrates one embodiment of the inventive color conversion process at a high level. At 610, the illustrated embodiment receives a number of control lines in a first color space, such as the 13 control lines described above. The control lines include a number of control points, and the control points have predetermined values in a second color space. The first color space could be, for instance, an RGB color space and the second color space could be, for instance, a CMYK color space or possibly a CMYKlclm color space.

Next, at 620, the process identifies a number of planar regions in the first color space among the control lines. That is, certain control lines, in groups of three or four, define the boundaries of the planar regions. In one embodiment, the planar regions include six triangular regions and six rectangular regions. The six rectangular regions may simply be the six external surfaces of the color space. The six triangular regions may be internal to the color space, and include all of the triangles that can be formed using the neutral control line.

Figure 9:
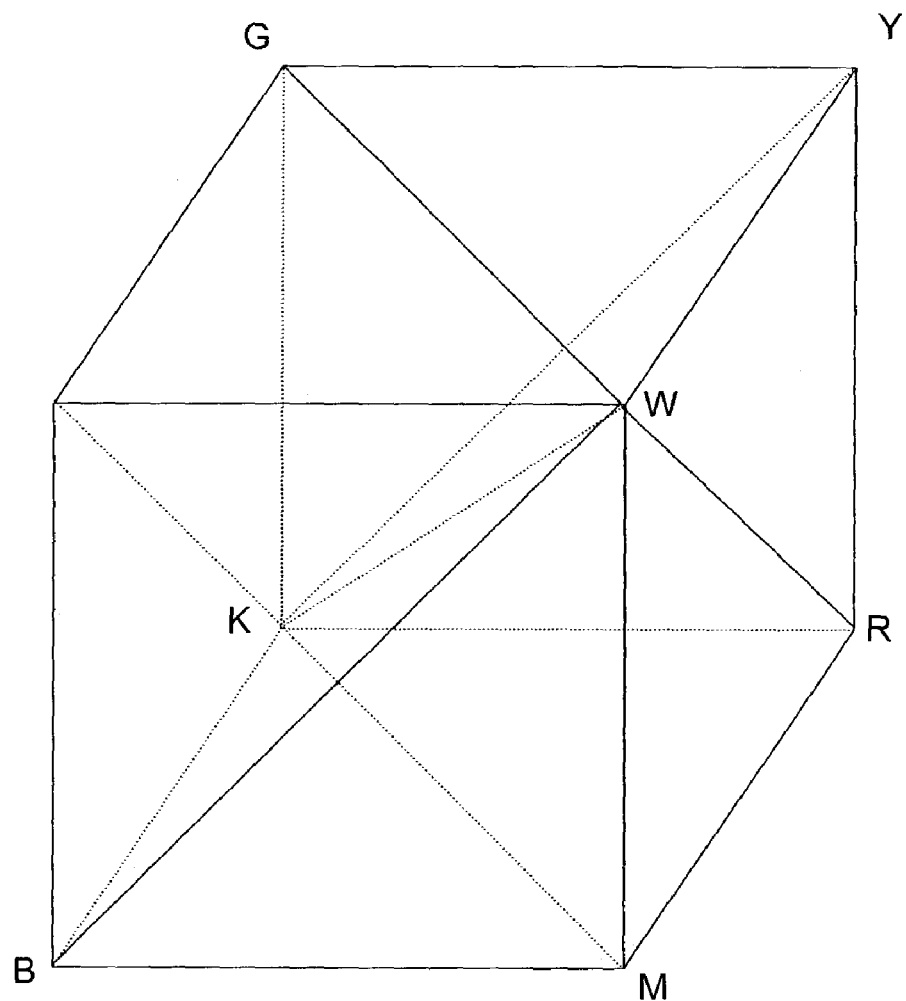
FIG. 9 illustrates one embodiment of a complete set of control lines.

For instance, skipping briefly to FIG. 9, all 13 control lines are shown together in an RGB color space. The six surface planes are WCBM, WCGY, WMRY, KRYG, KBMR, and KGCB. Each surface is formed by 4 of the 13 control lines. The neutral control line is WK, so the six triangles of control lines that are formed using WK are WKR, WKG, WKB, WKC, WKM, and WKY.

Returning to FIG. 6, at 630, the process partitions each planar region into at least one quadrangular area and another area. This partitioning establishes color separation. That is, a planar region is partitioned so as to define at least one quadrangular area that corresponds to a different subset of colorants than another area of the planar region. For example, if the second color space is a CMYK color space, K is not used for data points in the quadrangular area of the plane, but K may be used in another area of the plane. One embodiment of partitioning is described in more detail below with respect to FIG. 7.

Once regions have been defined using control lines, and color boundaries have been established within the regions, the process applies a "quadrangular" interpolation technique at 640. This quadrangular interpolation includes interpolating target points in the quadrangular regions from the first color space to the second color space using the predetermined values of control points bounding the respective quadrangular regions. One embodiment of this quadrangular interpolation is described in more detail below with respect to FIG. 7.

In the embodiment of FIG. 6, at 650, the process populates nodes in a LUT, such as the one shown in Table 1, with corresponding interpolated values of the target points. In other embodiments, rather than populating a LUT, color data can be interpolated dynamically as the data is are used.

Figure 7:
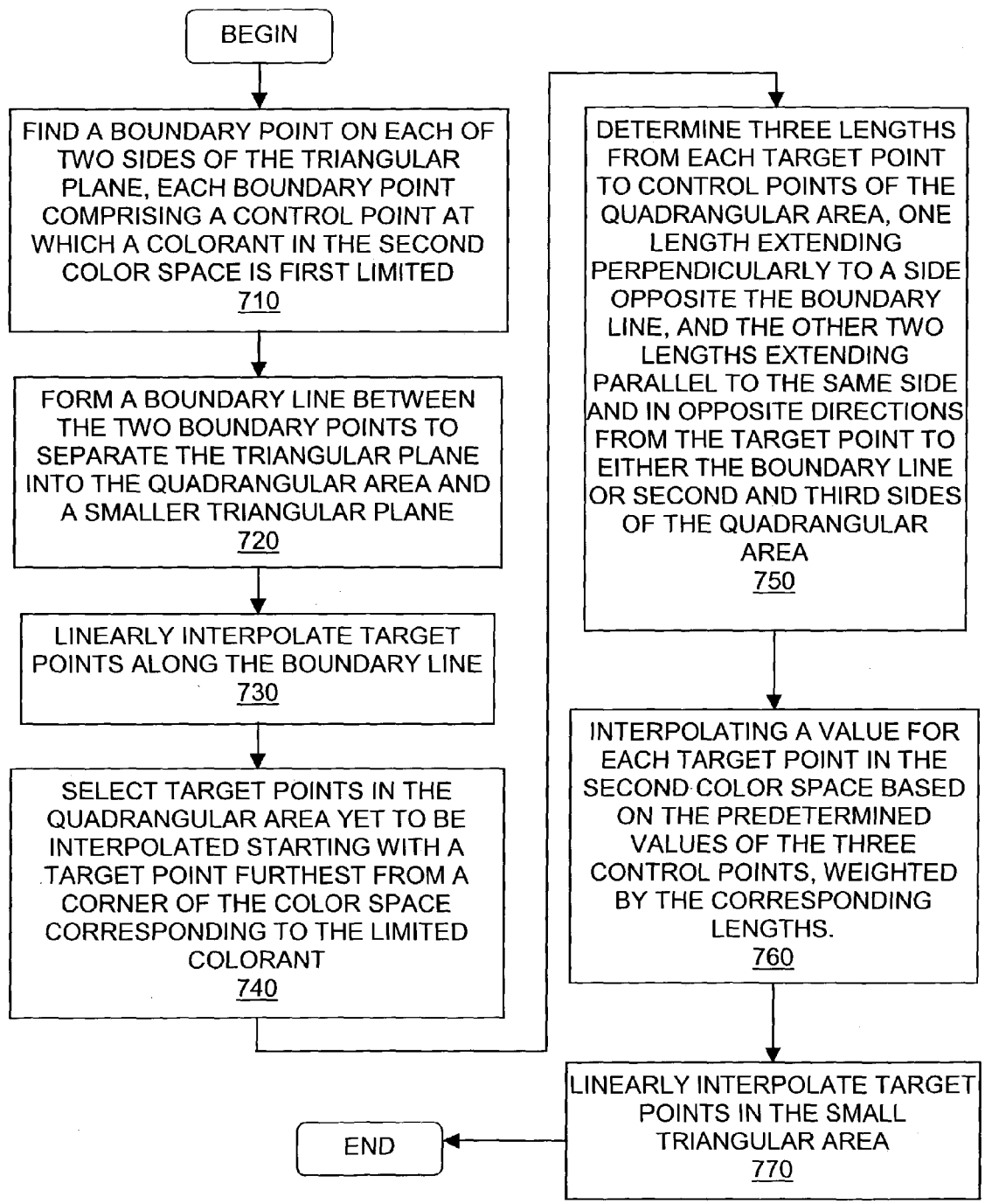
FIG. 7 illustrates one embodiment of the present invention as applied to triangular planes.

FIG. 7 illustrates in more detail one embodiment of the color separation and quadrangular interpolation processes from 630 and 640 of FIG. 6. The illustrated embodiment operates on a triangular region in the first color space. At 710, a boundary point is found on each of two sides of the triangular region. A boundary point is a control point at which a colorant from the second color space is first limited in a control line bounding the triangular region.

Figure 10:
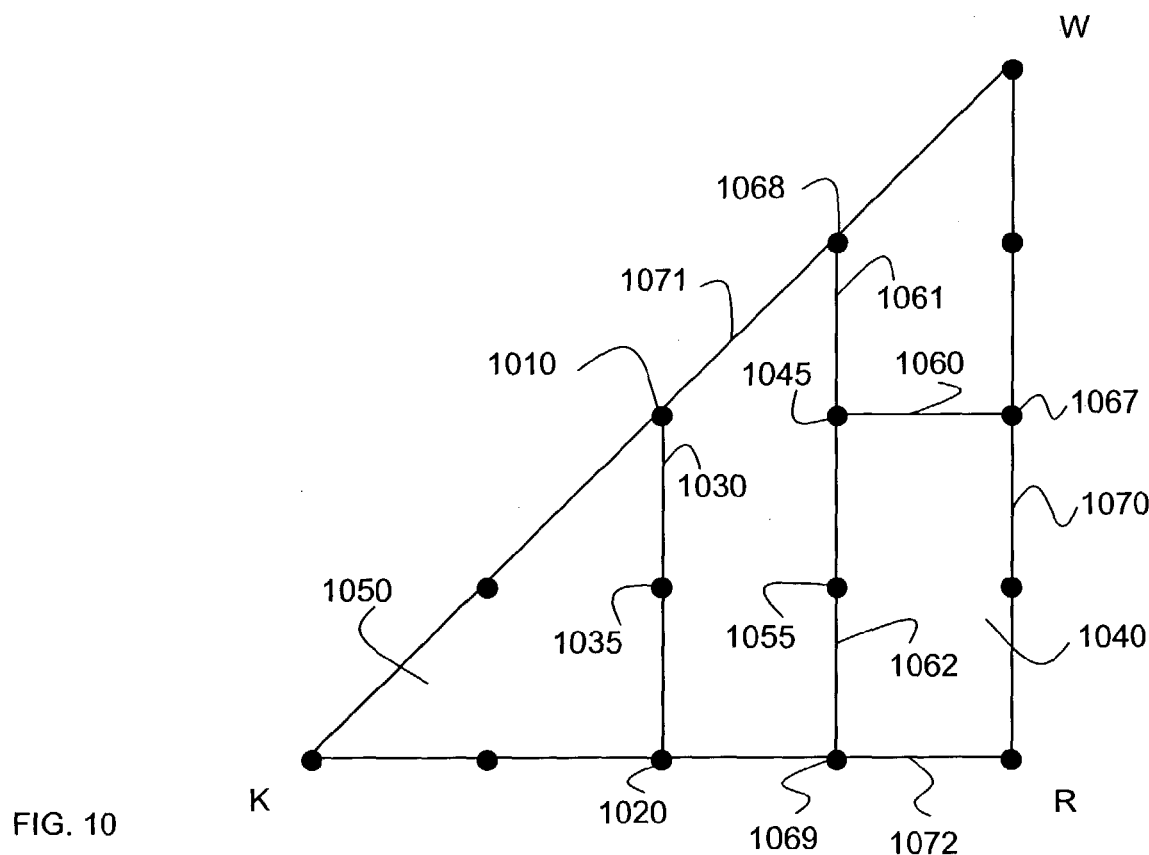
FIG. 10 illustrates one embodiment of an internal triangular plane.

For example, FIG. 10 illustrates triangle KWR from the RGB color space of Table 1. The triangle is bounded by control lines KW, KR, and WR. Each control line includes five control points in Table 1. KW, for instance, includes control points at (0,0,0), (63,63,63), (127,127,127), (191, 191,191), (255,255,255) in the RGB color space. K is the colorant that is supposed to be limited. Table 1 gives the corresponding values of K in the CMYK color space for each of those five control points. Specifically, K is 255 at the first control point, 127 at the second control point, and zero at the third, fourth, and fifth control points. Therefore, K is first limited at the third control point, making the third control point the boundary point, shown as point 1010. Using a similar approach for the KR control line, the boundary point 1020 can be found. In the WR control line, K is zero at every control point, so no boundary point is present.

Returning to FIG. 7, after the boundary points are found, a boundary line is formed between the two boundary points. This is shown in FIG. 10 at boundary line 1030. The boundary line separates the triangular region into quadrangular area 1040 and a smaller triangular area 1050. K will be limited to the smaller triangular area 1050 so quadrangular region 1040 will include only CMY colorants.

At 730, any target points along the boundary line are linearly interpolated. Any number of linear interpolation techniques can be used for these target points. For example, in FIG. 10, target point 1035 is on boundary line 1030. Target point 1035 is located half way between control points 1010 and 1020. In which case, one interpolation technique would take the average values of the colorants at 1010 and 1020. Specifically, control point 1010 is index 62 in Table 1, which corresponds to (127,127,127,0) in the CMYK space, and control point 1020 is index 50, which corresponds to (127,255,255,0) in the CMYK space. Target point 1035 corresponds to point (127,63,63) in the RGB space, which is index 56 in Table 1. Taking a linear interpolation of control points 1010 and 1020, target point 1035 would be (127,191, 191,0). Once a target point on the boundary line is interpolated, the target point can be added to a LUT. The target point can also be used as a control point to interpolate other target points.

At 740, target points in the quadrangular area are selected for interpolation starting from the furthest target point from a corner of the color space corresponding to the limited colorant and working in to the nearest target point. In FIG. 10, the K corner corresponds to the limited colorant, so the furthest target point would be point 1045 at (191,127,127). The next target point would be 1055 at (191,63,63).

At 750, three lengths are determined for each target point in the quadrangular region. One length extends perpendicularly from a target point to a control point on a side of the quadrangular region opposite the boundary line. In FIG. 10, this would be length 1060 which extends to control point 1067 in side 1070. The other two lengths extend from the target point, parallel to the side opposite the boundary line, and in opposite directions to control points in either the boundary line or second and third sides of the quadrangular region. In FIG. 10, these lengths would be length 1061, which extends to control point 1068 in side 1071, and length 1062, which extends to control point 1069 in side 1072.

Figure 11:
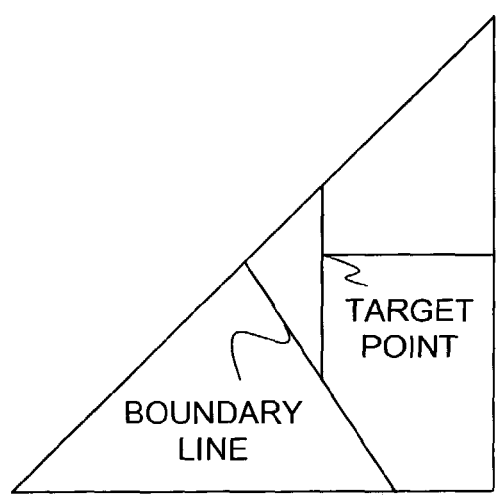
FIG. 11 illustrates one embodiment of a control point located on a boundary line.

In other embodiments, one of the parallel lengths may extend to the boundary line rather than a side of the quadrangular region. For instance, FIG. 11 illustrates one such example. In which case, rather than extending to a control point in a control line, the parallel length extends to a target point in the boundary line. But, since target points in the boundary line were previously interpolated back at 730, for instance, the target point in the boundary line can be used as a control point.

Referring again to FIG. 7, at 760, a value for the target point is interpolated in the second color space based on the predetermined values of the three control points, weighted by the three lengths from 750. For instance, in the example of FIG. 10, length 1060 is 64, length 1061 is 64, and length 1062 is 127. The predetermined value of control point 1067 is (0,127,127,0). The predetermined value of control point 1068 is (63,63,63,0). And, the predetermined value of control point 1069 is (63,255,255,0). K is limited, so K for target point 1045 is 0. C, M, and Y, however, can be calculated as follows:

Length Factor, $L = L_1 + L_2 + L_3 = 64 + 64 + 127 = 255$

Weight Factors: $W_1 = L/L_1 = 255/64$ $W_2 = L/L_2 = 255/64$ $W_3 = L/L_3 = 255/127$ $W = W_1 + W_2 + W_3 = 9.98$ Normalized Weight Factors: $N_1 = W_1/W = 0.4$ $N_2 = W_2/W = 0.4$ $N_3 = W_3/W = 0.2$ Target $C = (N_1 C_1 + N_2 C_2 + N_3 C_3) = 0.4*0 + 0.4*63 + 0.2*63 = 37.8$ Target $M = (N_1 M_1 + N_2 M_2 + N_3 M_3) = 0.4*127 + 0.4*63 + 0.2*255 = 127$ Target $Y = (N_1 Y_1 + N_2 Y_2 + N_3 Y_3) = 0.4*127 + 0.4*63 + 0.2*255 = 127$ Therefore, the interpolated value of target point 1045 in the second color space is (37.8,127,127,0). Of course, the calculation could have also been done for K, but the result would still have been zero. A similar approach can be used for each target point in the quadrangular region.

Referring again back to FIG. 7, after the target points in the quadrangular area have been interpolated, target points in the small triangular area are linearly interpolated at 770. In the example of FIG. 10, there are no target points in the smaller triangular region 1050. However, in other embodiments, any number of triangular interpolation techniques can be used.

All of the internal triangular planes can be interpolated using various embodiments of the present invention, such as the embodiment described in FIG. 7. These embodiments can also be used for multiple different color space conversions, including RGB to CMYK and RGB to CMYKlclm. To interpolate rectangular surface planes however, various embodiments of the present invention are slightly differently.

Figure 8:
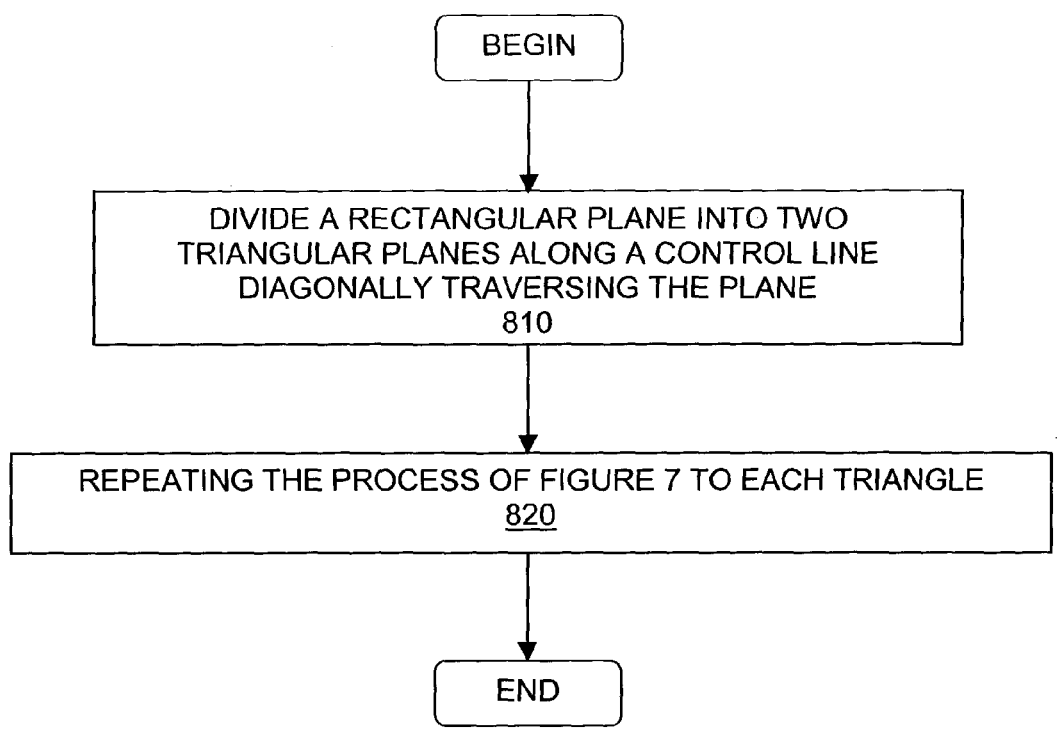
FIG. 8 illustrates one embodiment of the present invention as applied to rectangular planes.

For example, FIG. 8 illustrates one embodiment of the inventive interpolation process for rectangular planes. At 810, a rectangular plane is divided into two triangular planes along a control line diagonally traversing the plane. For example, in the color space of FIG. 9, the KGCB plane has a control line CK cutting diagonally across the surface. In which case, the KGCB plane can be divided into KGC and KCB triangles. Each of the six rectangular planes similarly has a diagonal control line to divide the six rectangles into 12 triangular surface planes.

Once the triangle planes are formed, an interpolation process, much like the one described in FIG. 7, can be applied to each triangle at 820. In many situations, the process of FIG. 7 can be applied to these triangular surface planes in almost exactly the same way as for the internal triangular planes.

Figure 12:
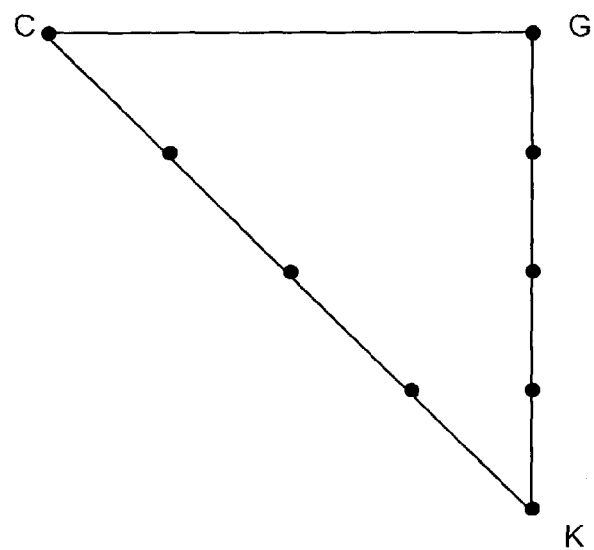
FIG. 12 illustrates one embodiment of a triangular surface plane.

For example, FIG. 12 illustrates the KGC surface plane in more detail. Unlike an internal triangular plane, KGC has control lines on only two sides, KG and KC. Points along side GC are target points. In which case, after inserting a boundary line to limit the K colorant and form the quadrangular region, the furthest target point for beginning the interpolation in the quadrangular region would be on GC. In other words, the first of the three lengths measured from the target point will be zero, leaving only the parallel lengths, which can be used to provide a linear interpolation. Once all of the target points along GC have been interpolated, they can be used as control points for interpolating more points inside the quadrangular area.

The process of FIG. 7 can also be used with only slight variation for triangular surface planes that do not include the K corner. For a CMYK color conversion, the process is almost identical to the process used for internal triangles, just replacing the K corner with the W corner. In most situations, if a triangle does not include K, K will be limited throughout the entire triangle. In which case, no boundary points will be found, the triangle will not be divided into two areas, and any number of linear interpolations can be applied to the entire triangle.

For surface triangles that do not include the K corner (i.e. include the W corner instead) in a CMYKlclm color conversion, various embodiments of the present invention can form boundary lines to limit the propagation of high dye C and M colorants to the high-light regions of the color space in which low dye lc and lm can be used instead, much like K is limited in other planes. The surface triangles are all arranged so that each triangle includes the W corner and two primaries. These triangles are: WCB, WBM, WMR, WRY, WYG, and WGC. Much like the embodiment of FIG. 7, a boundary point is found in each of the two control lines that connect between the W point and a primary point. A boundary line between the boundary points divide each triangle into a smaller triangular area and a quadrangular area. An example is shown in FIG. 15.

Figure 15:
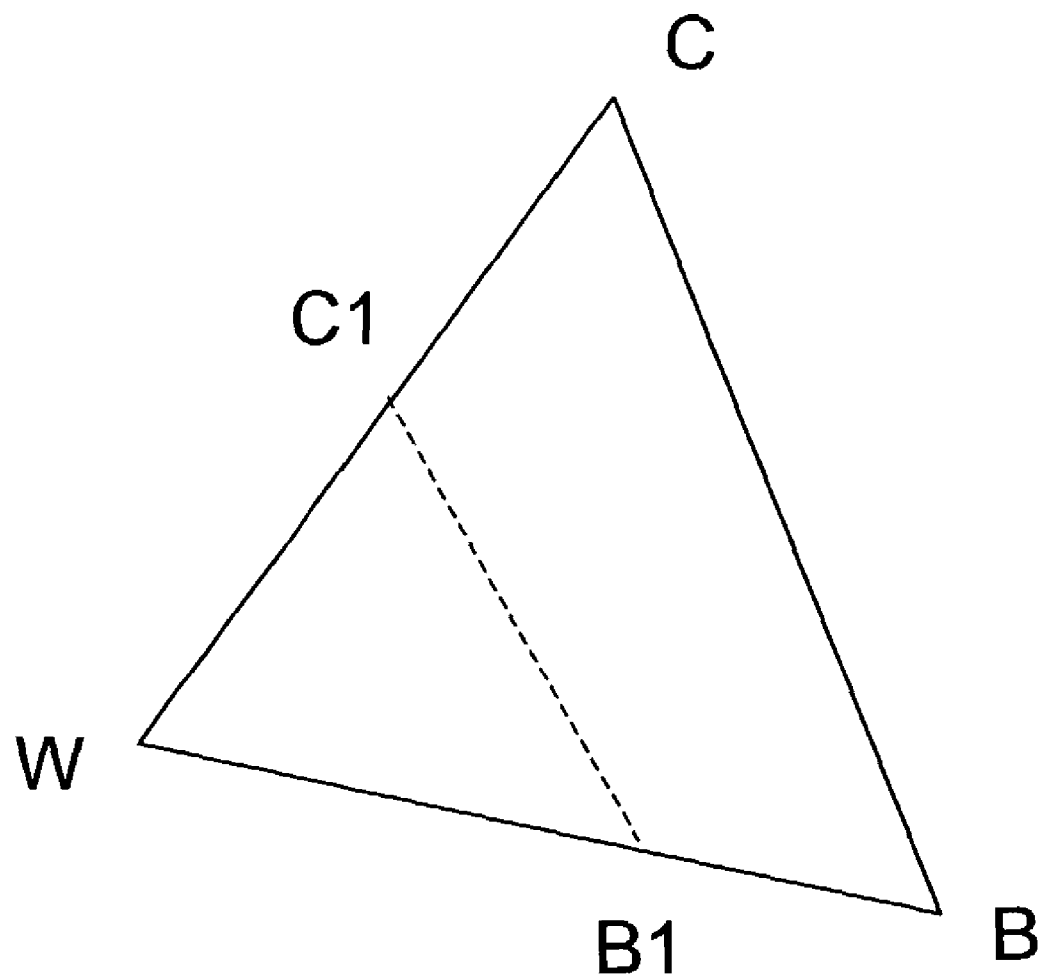
FIG. 15 illustrates one embodiment of a triangular surface plane that does not include the K corner.

In FIG. 15, points from W to C1 in control line WC use low-dye lc only, and points from C to the point before C1 use high-dye C and low-dye lc. C1 is the point at which the propagation of the high-dye is limited out of the low-dye region. The B1 point is determined similarly. Forming boundary line C1B1, the low-dye and high-dye regions are bounded by WC1B1 and C1B1BC. Then, interpolation, such as the interpolation used in the embodiment of FIG. 7, is applied to this triangle. However, rather than starting the interpolation within the quadrangular area with the target point furthest from the corner corresponding to the limited colorant (the K corner in previous examples), the interpolation can start with the target point furthest from the W corner.

If a first control line from W to a primary uses both high-dye and low-dye (e.g. control line WC) and the other uses only high-dye (e.g. control line WY), only the first control line will have a boundary point. That is, there is no point in the second control line at which the limited colorant is first limited. In order to form a boundary line in this situation, one embodiment of the present invention selects a control point at or near a mid point in the second control line, and uses that point as if it were a true boundary point to form the boundary line through the triangular area.

If neither control line includes a true boundary point because no limited colorant is used in a given triangular plane, any of a number of linear interpolation techniques can be applied to interpolate the entire triangular plane.

FIGS. 6–8 illustrate a number of implementation specific details. Other embodiments may not include all of the illustrated elements, may arrange the elements in a different order, may combine or separate one or more of the elements, and may add elements.

Figure 13:
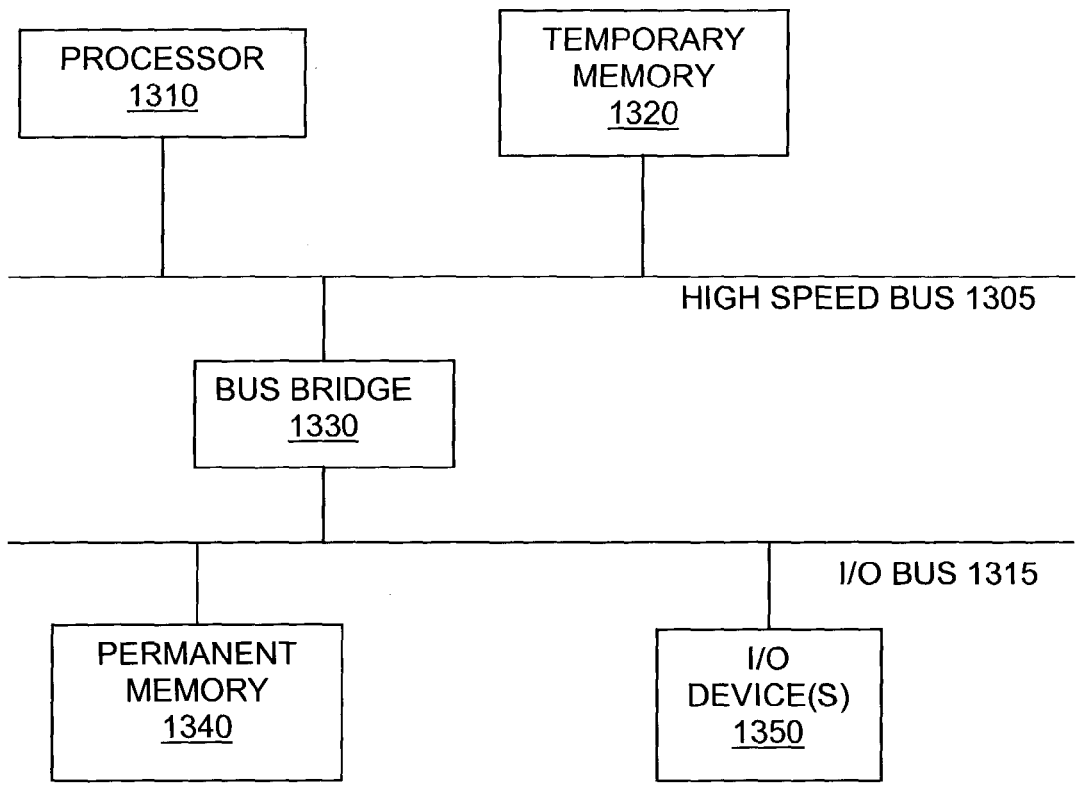
FIG. 13 illustrates one embodiment of a hardware system.

FIG. 13 illustrates one embodiment of a hardware system intended to represent a broad category of devices such as personal computers, workstations, embedded systems, and/or imaging devices such as color printers. In the illustrated embodiment, the hardware system includes processor 1310 coupled to high speed bus 1305, which is coupled to input/output (I/O) bus 1315 through bus bridge 1330. Temporary memory 1320 is coupled to bus 1305. Permanent memory 1340 is coupled to bus 1315. I/O device(s) 1350 is also coupled to bus 1315. I/O device(s) 1350 may include a display device, a keyboard, one or more external network interfaces, etc.

Certain embodiments may include additional components, may not require all of the above components, or may combine one or more components. For instance, temporary memory 1320 may be on-chip with processor 1310. Alternately, permanent memory 1340 may be eliminated and temporary memory 1320 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 13. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 1340.

Figure 14:
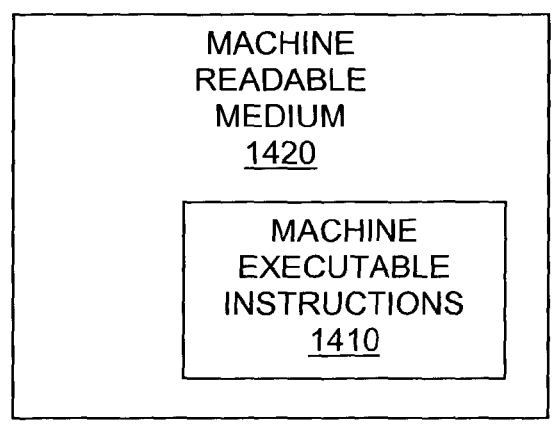
FIG. 14 illustrates one embodiment of a machine readable medium.

Alternately, as shown in FIG. 14, the software routines can be machine executable instructions 1410 stored using any machine readable storage medium 1420, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1350 of FIG. 13.

From whatever source, the instructions may be copied from the storage device into temporary memory 1320 and then accessed and executed by processor 1310. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the embodiments of the present invention. In another example, one or more functions of the embodiments of the present invention could be implemented in one or more ASICs on additional circuit boards and the circuit boards could be inserted into the computer(s) described above. In another example, programmable gate arrays could be used to implement one or more functions of embodiments of the present invention. In yet another example, a combination of hardware and software could be used to implement one or more functions of the embodiments of the present invention.

Thus, color space conversion using interpolation is described. Whereas many alterations and modifications of the embodiments of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A color space conversion method comprising:
   receiving a set of control lines in a first color space, each control line of the first set of control lines comprising a plurality of control points having predetermined values in a second color space;
   identifying a planar region among the set of control lines in the first color space, the planar region containing a plurality of target points to be interpolated from the first color space to the second color space;
   partitioning the planar region into at least a first area and a second area, target points in said second area corresponding to a different set of colorants from the second color space than target points in the first area;
   applying an interpolation to the target points in the second area to determine corresponding values in the second color space based at least in part on the predetermined values of control points bounding the second area;
   wherein the planar region comprises a triangular plane, and wherein partitioning the planar region comprises
      finding a boundary point on each of two sides of the triangular plane, each boundary point comprising a control point along a given control line at which a limited colorant in the second color space is first limited; and
      forming a boundary line between the two boundary points, said boundary line separating the triangular plane into the second area and the first area;
   and wherein, if a boundary point is found in only a first side of the triangular plane, the method further comprises:
      selecting a midpoint in a second side of the triangular plane; and
      using the midpoint as a second boundary point.

2. A color space conversion method comprising:
   receiving a set of control lines in a first color space, each control line of the first set of control lines comprising a plurality of control points having predetermined values in a second color space;
   identifying a planar region among the set of control lines in the first color space, the planar region containing a plurality of target points to be interpolated from the first color space to the second color space;
   partitioning the planar region into at least a first area and a second area, target points in said second area corresponding to a different set of colorants from the second color space than target points in the first area; and
   applying an interpolation to the target points in the second area to determine corresponding values in the second color space based at least in part on the predetermined values of control points bounding the second area;
   wherein the planar region comprises a triangular plane, and wherein partitioning the planar region comprises:
      finding a boundary point on each of two sides of the triangular plane, each boundary point comprising a control point along a given control line at which a limited colorant in the second color space is first limited; and
   forming a boundary line between the two boundary points, said boundary line separating the triangular plane into the second area and the first area, and
   wherein the second area comprises a quadrangular area and wherein applying the interpolation comprises:
      linearly interpolating target points along the boundary line;
      selecting a selected target point in the quadrangular area;
      determining a first length perpendicular from the selected target point to a first control point in a1 first side of the quadrangular area opposite the boundary line;
      determining a second length parallel to the first side from the selected target point to a1 second control point in the quadrangular area, the second control point being in one of the boundary line and a second side of the quadrangular area between the first side and the boundary line;
      determining a third length parallel to the first side from the selected target point to a1 third control point in the quadrangular area, the third control point being in one of the boundary line and a third side of the quadrangular area between the first side and the boundary line; and
      interpolating a value for the selected target point in the second color space based on the predetermined values of the first, second, and third control points in the second color space, weighted by the corresponding first, second, and third lengths.

3. The method of claim 2 wherein said selected target point comprises a target point that is yet to be interpolated and is also furthest in the quadrangular area from a corner of the first color space corresponding to the limited colorant.

4. The method of claim 3 wherein the corner of the first color space comprises one of a K corner and a W corner.

5. The method of claim 2 wherein, if said first length is zero, said selected target point is located in the first side, and, if said first length is non-zero, said first control point comprises a previous target point in the first side.

6. The method of claim 2 wherein the first area comprises a smaller triangular plane and applying the interpolation further comprises: linearly interpolating target points in the smaller triangular plane.

7. A color space conversion method comprising:
   receiving a set of control lines in a first color space, each control line of the first set of control lines comprising a plurality of control points having predetermined values in a second color space;

identifying a planar region among the set of control lines in the first color space, the planar region containing a plurality of target points to be interpolated from the first color space to the second color space;

partitioning the planar region into at least a first: area and a second area, target points in said second area corresponding to a different set of colorants from the second color space than target points in the first area; and applying an interpolation to the target points in the second area to determine corresponding values in the second color space based at least in part on the predetermined values of control points bounding the second area;

and wherein the planar region comprises a rectangular plane, and wherein partitioning the planar region comprises:

dividing the rectangular plane into two triangular planes along a control line among the set of control lines diagonally traversing the rectangular plane;

for a first triangular plane of the two triangular planes, finding a boundary point on each of two sides of the first triangular plane, each boundary point comprising a control point along a given control line at which a limited colorant in the second color space is first limited; and forming a boundary line between the two boundary points, said boundary line separating the first triangular plane into the first area and the second area;

and wherein, if a boundary point is found in only a first side of the triangular plane, the method further comprises:

selecting a midpoint in a second side of the triangular plane; and using the midpoint as a second boundary point.

8. A color space conversion method comprising:

receiving a set of control lines in a first color space, each control line of the first set of control lines comprising a plurality of control points having predetermined values in a second color space;

identifying a planar region among the set of control lines in the first color space, the planar region containing a plurality of target points to be interpolated from the first color space to the second color space;

partitioning the planar region into at least a first: area and a second area, target points in said second area corresponding to a different set of colorants from the second color space than target points in the first area; and applying an interpolation to the target points in the second area to determine corresponding values in the second color space based at least in part on the predetermined values of control points bounding the second area;

and wherein the planar region comprises a rectangular plane, and wherein partitioning the planar region comprises:

dividing the rectangular plane into two triangular planes along a control line among the set of control lines diagonally traversing the rectangular plane;

for a first triangular plane of the two triangular planes, finding a boundary point on each of two sides of the first triangular plane, each boundary point comprising a control point along a given control line at which a limited colorant in the second color space is first limited; and forming a boundary line between the two boundary points, said boundary line separating the first triangular plane into the first area and the second area;

and wherein the second area comprises a quadrangular area and wherein applying the interpolation comprises:

linearly interpolating target points along the boundary line;

selecting a selected target point in the quadrangular area;

determining a first length perpendicular from the selected target point to a first control point in a first side of the quadrangular area opposite the boundary line;

determining a second length parallel to the first side from the selected target point to a second control point in the quadrangular area, the second control point being in one of the boundary line and a second side of the quadrangular area between the first side and the boundary line;

determining a third length parallel to the first side from the selected target point to a third control point in the quadrangular area, the third control point being in one of the boundary line and a third side of the quadrangular area between the first side and the boundary line; and interpolating a value for the selected target point in the second color space based on the predetermined values of the first, second, and third control points in the second color space, weighted by the corresponding first, second, and third lengths.

9. The method of claim 8 wherein said selected target point is a target point that is yet to be interpolated and is also furthest target in the quadrangular area from a corner of the first color space corresponding to the limited colorant.

10. The method of claim 8 wherein the corner of the first color space comprises a K corner if the limited colorant is K, and a W corner if the limited colorant is C or M.

11. The method of claim 8 wherein the first area comprises a smaller triangular plane and wherein applying the interpolation further comprises:

linearly interpolating target points in the smaller triangular plane.

12. The method of claim 8 wherein applying the interpolation further comprises:

repeating the interpolation process as applied to the first triangular plane to a second triangular plane of the two triangular planes.

13. A color space conversion method comprising:

receiving a target point and a plurality of control points in a first color space, said plurality of control points defining a quadrangular region containing the target point, and each of the plurality of control points having a predetermined value in a second color space;

determining three lengths from the target point to three control points of the plurality of control points, a first length of the three lengths being perpendicular to a base side of the quadrangular region, and a second length and a third length of the three lengths being parallel to the base side, in opposite directions from the target point; and interpolating a value of the target point in the second color space based on the predetermined values of the three control points in the second color space, with each of the predetermined values weighted by a corresponding one of the three lengths.

14. The method of claim 13 further comprising:

identifying a triangular region containing the target point, said triangular region comprising three control lines;

determining a first colorant limit point on a first control line of the three control lines;

determining a second colorant limit point on a second control line of the three control lines; and generating a boundary line through the triangular region connecting the first colorant limit point and the second colorant limit point, the boundary line separating the triangular region into the quadrangular region and a smaller triangular region.

15. The method of claim 14 wherein the base side of the quadrangular region comprises a third control line of the three control lines.

16. The method of claim 14 wherein each of the three control lines comprises a set 5 of control points in the first color space, each set of control points comprising a primary control point at each end of a respective control line and one or more secondary control points between the primary control points, each of the set of control points having predetermined values in the second color space.

17. The method of claim 16 wherein determining the first colorant limit point comprises:

identifying a limited colorant in the second color space; and identifying the first colorant limit point in the set of control points along the first control line where the limited colorant is first limited.

18. The method of claim 17 wherein identifying the first colorant limit point comprises:

selecting one of the three control lines as a selected control line;

traversing the set of control points along the selected control line from one end toward the other;

determining values in the second color space for each of the set of control points traversed; and if the limited colorant goes to zero among the set of control points along the selected control line, flagging the first colorant limit point where the limited colorant first goes to zero.

19. The method of claim 18 wherein identifying the first colorant limit point further comprises:

if the limited colorant does not go to zero among the set of control points along the selected control line, selecting a next control line among the three control lines; and repeating the traversing, determining, and flagging for the next control line.

20. The method of claim 18 wherein, once the first colorant limit point is identified, determining the second colorant limit point comprises:

selecting a next control line among the three control lines;

traversing the set of control points along the next control line from one end toward the other;

determining values in the second color space for each of the set of control points traversed; and if the limited colorant goes to zero among the set of control points along the next control line, flagging the second colorant limit point where the limited colorant first goes to zero.

21. The method of claim 20 wherein determining the second colorant limit point further comprises:

if the limited colorant does not go to zero among the set of control points along the next control line, selecting a third control line among the three control lines; and repeating the traversing, determining, and flagging for the third control line.

22. The method of claim 14 further comprising:

linearly interpolating values in the second color space for boundary control points along the boundary line.

23. The method of claim 22 wherein the plurality of control points defining the quadrangular region includes the boundary control points.

24. A machine readable medium having stored thereon machine executable instructions, the execution of which implement a color space conversion method comprising:

receiving a set of control lines in a first color space, each control line of the first set of control lines comprising a plurality of control points having predetermined values in a second color space;

identifying a planar region among the set of control lines in the first color space, the planar region containing a plurality of target points to be interpolated from the first color space to the second color space;

partitioning the planar region into at least a first area and a second area, target points in said second area corresponding to a different set of colorants from the second color space than target points in the first area; and applying an interpolation to the target points in the second area to determine corresponding values in the second color space based at least in part on the predetermined values of control points bounding the second area;

wherein the planar region comprises a triangular plane, and wherein partitioning the planar region comprises:

finding a boundary point on each of two sides of the triangular plane, each boundary point comprising a control point along a given control line at which a limited colorant in the second color space is first limited; and forming a boundary line between the two boundary points, said boundary line separating the triangular plane into the first area and the second area;

and wherein, if a boundary point is found in only a first side of the triangular plane, the method further comprises:

selecting a midpoint in a second side of the triangular plane; and using the midpoint as a second boundary point.

25. The machine readable medium of claim 24 wherein the second area comprises a quadrangular area and wherein applying the interpolation comprises:

linearly interpolating target points along the boundary line;

selecting a selected target point in the quadrangular area;

determining a first length perpendicular from the selected target point to a first control point in a first side of the quadrangular area opposite the boundary line;

determining a second length parallel to the first side from the selected target point to a second control point in the quadrangular area, the second control point being in one of the boundary line and a second side of the quadrangular area between the first side and the boundary line;

determining a third length parallel to the first side from the selected target point to a third control point in the quadrangular area, the third control point being in one of the boundary line and a third side of the quadrangular area between the first side and the boundary line; and interpolating a value for the selected target point in the second color space based on the predetermined values of the first, second, and third control points in the second color space, weighted by the corresponding first, second, and third lengths.

26. The machine readable medium of claim 25 wherein the first area comprises a smaller triangular plane and wherein applying the interpolation further comprises:

linearly interpolating target points in the smaller triangular plane.

27. A machine readable medium having stored thereon machine executable instructions, the execution of which implement a color space conversion method comprising:
   receiving a set of control lines in a first color space, each control line of the first set of control lines comprising a plurality of control points having predetermined values in a second color space;
   identifying a planar region among the set of control lines in the first color space, the planar region containing a plurality of target points to be interpolated from the first color space to the second color space;
   partitioning the planar region into at least a first area and a second area, target points in said second area corresponding to a different set of colorants from the second color space than target points in the first area; and
   applying an interpolation to the target points in the second area to determine corresponding values in the second color space based at least in part on the predetermined values of control points bounding the second area;
   wherein the planar region comprises a rectangular plane, and wherein partitioning the planar region comprises;
   dividing the rectangular plane into two triangular planes along a control line among the set of control lines diagonally traversing the rectangular plane;
   for a first triangular plane of the two triangular planes, finding a boundary point on each of two sides of the first triangular plane, each boundary point comprising a control point along a given control line at which a limited colorant in the second color space is first limited; and
   forming a boundary line between the two boundary points, said boundary line separating the first triangular plane into the first area and the second area;
   and wherein, if a boundary point is found in only a first side of the triangular plane, the method further comprises:
   selecting a midpoint in a second side of the triangular plane; and using the midpoint as a second boundary point.

28. The machine readable medium of claim 27 wherein the second area comprises a quadrangular area and wherein applying the interpolation comprises:
   linearly interpolating target points along the boundary line;
   selecting a selected target point in the quadrangular area;
   determining a first length perpendicular from the selected target point to a first control point in a first side of the quadrangular area opposite the boundary line;
   determining a second length parallel to the first side from the selected target point to a second control point in the quadrangular area, the second control point being in one of the boundary line and a second side of the quadrangular area between the first side and the boundary line;
   determining a third length parallel to the first side from the selected target point to a third control point in the quadrangular area, the third control point being in one of the boundary line and a third side of the quadrangular area between the first side and the boundary line; and
   interpolating a value for the selected target point in the second color space based on the predetermined values of the first, second, and third control points in the second color space, weighted by the corresponding first, second, and third lengths.

29. An apparatus for color space conversion comprising:
   a processor; and
   a memory device to store instructions for execution by the processor to implement a color space conversion method comprising:
   receiving a set of control lines in a first color space, each control line of the first set of control lines comprising a plurality of control points having predetermined values in a second color space;
   identifying a planar region among the set of control lines in the first color space, the planar region containing a plurality of target points to be interpolated from the first color space to the second color space;
   partitioning the planar region into at least a first area and a second area, target points in said second area corresponding to a different set of colorants from the second color space than target points in the first area; and
   applying a quadrangular interpolation to the target points in the second area to determine corresponding values in the second color space based at least in part on the predetermined values of control points bounding the second area;
   wherein the planar region comprises a triangular plane, and wherein partitioning the planar region comprises:
   finding a boundary point on each of two sides of the triangular plane, each boundary point comprising a control point along a given control line at which a limited colorant in the second color space is first limited; and
   forming a boundary line between the two boundary points, said boundary line separating the triangular plane into the first area and the second area;
   and wherein the second area comprises a quadrangular area and wherein applying the interpolation comprises:
   linearly interpolating target paints along the boundary line;
   selecting a selected target point in the quadrangular area;
   determining a first length perpendicular from the selected target point to a first control point in a first side of the quadrangular area opposite the boundary line;
   determining a second length parallel to the first side from the selected target point to a second control point in the quadrangular area, the second control point being in one of the boundary line and a second side of the quadrangular area between the first side and the boundary line;
   determining a third length parallel to the first side from the selected target point to a third control point in the quadrangular area, the third control point being in one of the boundary line and a third side of the quadrangular area between the first side and the boundary line; and
   interpolating a value for the selected target point in the second color space based on the predetermined values of the first, second, and third control points in the second color space, weighted by the corresponding first, second, and third lengths.

* * * * *

UNITED STATES PATENT AND TRADEMARK OFFICE
CERTIFICATE OF CORRECTION

PATENT NO. : 7,190,827 B2  
APPLICATION NO. : 10/349880  
DATED : March 13, 2007  
INVENTOR(S) : Huanzhao Zeng et al.

It is certified that error appears in the above-identified patent and that said Letters Patent is hereby corrected as shown below:

On sheet 7 of 10, Fig. 9, delete " 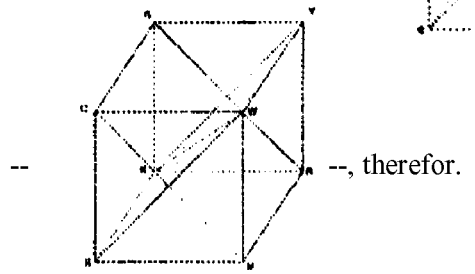 " and insert

-- 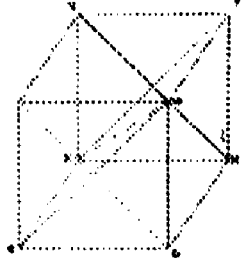 --, therefor.

In column 14, line 5, in Claim 2, after "first" delete ":".

In column 14, line 30, in Claim 2, delete "al" and insert -- a --, therefor.

In column 14, line 35, in Claim 2, delete "a1" and insert -- a --, therefor.

In column 14, line 41, in Claim 2, delete "a1" and insert -- a --, therefor.

In column 15, line 7, in Claim 7, after "first" delete ":".

In column 15, line 45, in Claim 8, after "first" delete ":".

In column 16, line 32, in Claim 10, delete "claim 8" and insert -- claim 9 --, therefor.

In column 17, line 12, in Claim 16, after "set" delete "5".

In column 18, line 4, in Claim 24, delete "machine readable" and insert -- computer-readable --, therefor.

In column 18, line 5, in Claim 24, delete "machine" and insert -- computer --, therefor.

UNITED STATES PATENT AND TRADEMARK OFFICE
CERTIFICATE OF CORRECTION

PATENT NO. : 7,190,827 B2
APPLICATION NO. : 10/349880
DATED : March 13, 2007
INVENTOR(S) : Huanzhao Zeng et al.

It is certified that error appears in the above-identified patent and that said Letters Patent is hereby corrected as shown below:

In column 18, line 39, in Claim 25, delete "machine readable" and insert -- computer-readable --, therefor.

In column 18, line 65, in Claim 26, delete "machine readable" and insert -- computer-readable --, therefor.

In column 20, line 39, in Claim 29, delete "paints" and insert -- points --, therefor.

Signed and Sealed this

Fourth Day of November, 2008

JON W. DUDAS
*Director of the United States Patent and Trademark Office*